United States Patent
Primus et al.

(10) Patent No.: US 9,140,179 B2
(45) Date of Patent: Sep. 22, 2015

(54) SYSTEM AND METHOD FOR CONTROLLING EXHAUST EMISSIONS AND SPECIFIC FUEL CONSUMPTION OF AN ENGINE

(71) Applicant: General Electric Company, Schenectady, NY (US)

(72) Inventors: Roy James Primus, Niskayuna, NY (US); Omowoleola Chukwuemeka Akinyemi, Clifton Park, NY (US); Thomas Michael Lavertu, Clifton Park, NY (US); James Robert Mischler, Girard, PA (US); Venu Gopal Gummadavelli, Erie, PA (US)

(73) Assignee: General Electric Company, Niskayuna, NY (US)

( * ) Notice: Subject to any disclaimer, the term of this patent is extended or adjusted under 35 U.S.C. 154(b) by 169 days.

(21) Appl. No.: 13/655,764

(22) Filed: Oct. 19, 2012

(65) Prior Publication Data
US 2014/0109571 A1    Apr. 24, 2014

(51) Int. Cl.
*F02M 25/07*    (2006.01)
*F02B 37/00*    (2006.01)
(Continued)

(52) U.S. Cl.
CPC ............. *F02B 37/004* (2013.01); *F02B 37/013* (2013.01); *F02B 37/18* (2013.01); *F02D 41/0007* (2013.01); *F02D 41/0052* (2013.01); *F02M 25/0707* (2013.01); *F02M 25/0711* (2013.01); *F02M 25/0749* (2013.01);
(Continued)

(58) Field of Classification Search
CPC .............. F02M 25/07; F02M 25/0707; F02M 25/0711; F02M 25/0749; F02M 25/0739; F02M 25/0713; F02M 25/0754; F02D 41/26; F02D 41/0052; F02D 41/0007; F02B 37/18; F02B 47/08; F02B 29/0412; F02B 29/0432; Y02T 10/47; Y02T 10/144
USPC ..................... 60/602, 605.1, 605.2, 611–612; 123/568.11, 568.12, 562; 701/108
See application file for complete search history.

(56) References Cited

U.S. PATENT DOCUMENTS

| 4,213,435 A | 7/1980 | Simka |
| 5,168,853 A | 12/1992 | Kittelson et al. |

(Continued)

FOREIGN PATENT DOCUMENTS

EP    1024263 B1    1/2002

OTHER PUBLICATIONS

Hai Wu;"Performance Simulation and Control Design for Diesel Engine Nox Emission Reduction Technologies"; Dissertation Submitted in Graduate College of the University of Illinois at Urbana-Champaign, 2011; 177 Pages.

*Primary Examiner* — Thai Ba Trieu
*Assistant Examiner* — Jason T Newton
(74) *Attorney, Agent, or Firm* — Joseph J. Christian (57) ABSTRACT

A method includes combusting air within a plurality of cylinders of an internal combustion engine by injecting a fuel into the plurality of cylinders. The method further includes expanding a first portion of an exhaust gas generated from the plurality of combustion cylinders via a turbine. The method further includes controlling at least one of feeding a second portion of the exhaust gas via an exhaust channel bypassing the turbine; and recirculating a third portion of the exhaust gas to the plurality of combustion cylinders via a recirculation channel, as a function of an intake manifold air temperature and pressure at which the engine is operated.

27 Claims, 4 Drawing Sheets

(51) Int. Cl.
  *F02B 37/18* (2006.01)
  *F02D 41/00* (2006.01)
  *F02B 37/013* (2006.01)
  *F02B 29/04* (2006.01)

(52) U.S. Cl.
  CPC ......... *F02B29/0412* (2013.01); *F02B 29/0425* (2013.01); *F02B 29/0437* (2013.01); *F02D 2200/0414* (2013.01); *F02D 2200/703* (2013.01); *F02M 25/0713* (2013.01); *F02M 25/0727* (2013.01); *F02M 25/0739* (2013.01); *F02M 25/0754* (2013.01); *Y02T 10/144* (2013.01); *Y02T 10/47* (2013.01)

(56) References Cited

U.S. PATENT DOCUMENTS

| | | | | |
|---|---|---|---|---|
| 5,901,683 | A * | 5/1999 | Patel | 123/352 |
| 6,009,709 | A * | 1/2000 | Bailey | 60/605.2 |
| 6,493,627 | B1 * | 12/2002 | Gallagher et al. | 701/104 |
| 6,742,506 | B1 * | 6/2004 | Grandin | 123/568.12 |
| 6,899,090 | B2 * | 5/2005 | Arnold | 123/568.12 |
| 6,945,047 | B2 * | 9/2005 | Shea et al. | 60/602 |
| 7,055,504 | B1 * | 6/2006 | Gallagher et al. | 123/501 |
| 7,066,143 | B1 * | 6/2006 | Gallagher et al. | 123/380 |
| 7,246,604 | B2 | 7/2007 | Cullen | |
| 7,296,555 | B2 * | 11/2007 | Tamma et al. | 123/304 |
| 7,360,523 | B2 | 4/2008 | Sloane et al. | |
| 7,444,815 | B2 * | 11/2008 | Baumgard et al. | 60/605.2 |
| 7,726,287 | B2 | 6/2010 | Sekfane | |
| 8,060,293 | B2 | 11/2011 | Meyer et al. | |
| 8,078,384 | B2 | 12/2011 | Glugla et al. | |
| 8,307,646 | B2 * | 11/2012 | Cattani et al. | 60/605.2 |
| 8,439,021 | B2 * | 5/2013 | Vuk | 123/568.13 |
| 2002/0112478 | A1 * | 8/2002 | Pfluger | 60/612 |
| 2005/0000497 | A1 * | 1/2005 | Nakai et al. | 123/568.12 |
| 2009/0199825 | A1 * | 8/2009 | Piper et al. | 123/568.21 |
| 2010/0236532 | A1 | 9/2010 | Xiao et al. | |
| 2011/0000470 | A1 * | 1/2011 | Roth | 123/568.11 |
| 2011/0083641 | A1 * | 4/2011 | Gokhale et al. | 123/435 |
| 2011/0131957 | A1 * | 6/2011 | Hepburn et al. | 60/278 |
| 2011/0307127 | A1 * | 12/2011 | Swenson et al. | 701/21 |

* cited by examiner

SYSTEM AND METHOD FOR CONTROLLING EXHAUST EMISSIONS AND SPECIFIC FUEL CONSUMPTION OF AN ENGINE

BACKGROUND

The embodiments of the present invention relate generally to a system and method of operating an engine and, more specifically, to a system and method for controlling exhaust emissions and specific fuel consumption of an engine.

Compression-ignition engines, such as diesel engines, operate by directly injecting a fuel (e.g., diesel fuel) into compressed air in one or more piston-cylinder assemblies, such that the heat of the compressed air ignites the fuel-air mixture. Compression-ignition engines may also include a glow plug to provide heat to ensure ignition. The direct fuel injection atomizes the fuel into droplets, which evaporate and mix with the compressed air in the combustion chambers of the piston-cylinder assemblies. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides ($NO_x$), sulfur oxides ($SO_x$), particulate matter (PM), and smoke. The amount and relative proportion of these pollutants varies according to the fuel-air mixture, compression ratio, injection timing, environmental conditions (e.g., atmospheric pressure, temperature, etc.), and the like.

In certain applications, the compression-ignition engines are used in relatively extreme environmental conditions, such as high altitudes, particularly in mountainous regions. These environmental conditions can adversely affect engine performance, efficiency, exhaust pollutants, and other engine characteristics. For example, diesel engines operating in mountainous regions are subject to greater loads due to higher gradients, lower atmospheric pressures due to higher altitudes, lower temperatures due to colder climate or higher altitude, lower air density due to lower atmospheric pressure, and the like.

The various engine parameters are particularly susceptible to exceed engine design limits when the engine is operating at a full load at extreme ambient temperature and altitude conditions. It is difficult to adequately account for the impact of ambient conditions to control exhaust emissions and specific fuel consumption of the engine to specific limits.

An enhanced technique for controlling exhaust emissions and specific fuel consumption of an engine is desired.

BRIEF DESCRIPTION

In accordance with one exemplary embodiment of the present invention, a method is disclosed. The method includes combusting air within a plurality of cylinders of an internal combustion engine by injecting a fuel into the plurality of cylinders. The method further includes expanding a first portion of an exhaust gas generated from the plurality of combustion cylinders via a turbine. The method further includes controlling at least one of feeding a second portion of the exhaust gas via an exhaust channel bypassing the turbine; and recirculating a third portion of the exhaust gas to the plurality of combustion cylinders via a recirculation channel, as a function of an intake manifold air temperature and pressure at which the engine is operated.

In accordance with another exemplary embodiment of the present invention, a system is disclosed. The system includes an engine having a plurality of combustion cylinders. A turbine is coupled to the engine, and configured to expand a first portion of an exhaust gas generated from the plurality of combustion cylinders. An exhaust channel feeds a second portion of the exhaust gas bypassing the turbine. a recirculation channel recirculates a third portion of the exhaust gas to the plurality of combustion cylinders. A control system is configured to control at least one of feed of the second portion of the exhaust gas via the exhaust channel; and recirculation of the third portion of the exhaust gas to the plurality of combustion cylinders via a recirculation channel, as a function of an intake manifold air temperature and pressure at which the engine is operated.

In accordance with another exemplary embodiment of the present invention, a non-transitory computer readable medium encoded with a program for a processor-based control unit is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
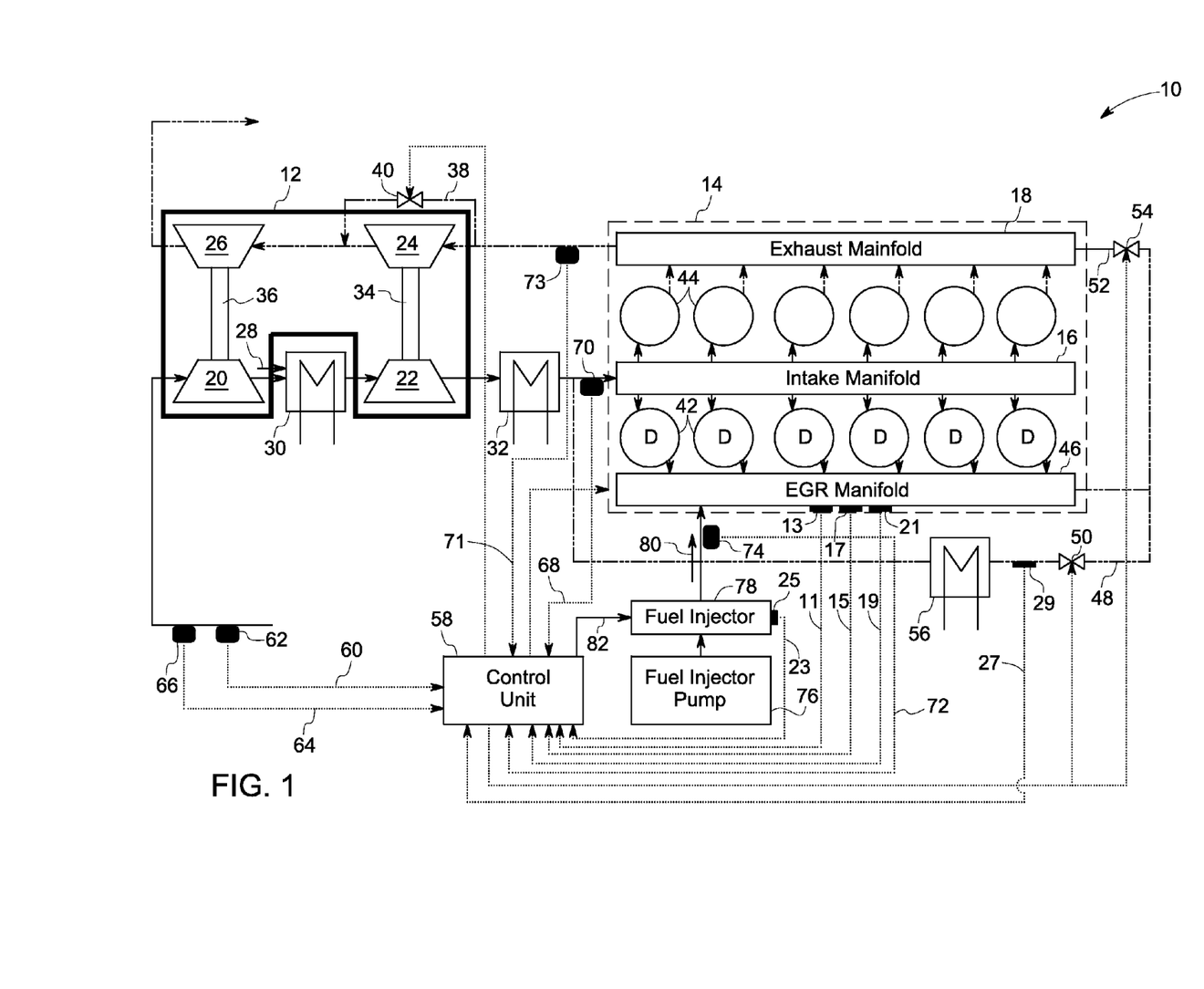
FIG. 1 is a diagrammatical representation of a system in accordance with an exemplary embodiment of the present invention.

Referring to FIG. 1, a turbocharged unit 10 having exhaust emission and specific fuel consumption (SFC) control features, is illustrated in accordance with certain embodiments of the present invention. The turbocharged unit 10 includes a turbo-charger 12 and a compression-ignition engine, e.g., a diesel engine 14. A motor-generator unit (not shown) may be mechanically coupled to the turbocharger 12. As discussed in further detail below, embodiments of the present invention provide monitoring and control features, such as sensors and control logic, for maintaining a SFC of the engine 14 and a quantity of exhaust emissions in the exhaust gas, within a predefined SFC limit and an emission limit respectively, by controlling feed of a portion of the exhaust gas bypassing a turbine and/or recirculating a portion of the exhaust gas to the engine 14, as a function of ambient conditions such an intake manifold air temperature and pressure at which the engine 14 is operated. In certain embodiments, fuel injection timing and/or engine speed may also be controlled as a function of ambient conditions.

The illustrated engine 14 includes an air intake manifold 16 and an exhaust manifold 18. The turbo-charger 12 includes a first-stage compressor 20, a second-stage compressor 22, a first-stage turbine 24, and a second-stage turbine 26. Intake air 28 may be drawn through a filter (not shown) and then compressed to a higher pressure via the first-stage compressor 20. The temperature of air is increased due to compression. The compressed intake air 28 is cooled via an intercooler 30, and then further compressed to a further higher pressure via the second-stage compressor 22. The compressed air is then cooled via another intercooler 32 and then supplied to the intake manifold 16 for combustion within the engine 14. The compressed air flows through the intercooler 32 such that the temperature of air is reduced prior to delivery into the intake manifold 16 of the engine 14. In one embodiment, the intercoolers 30, 32 may be air-to-water heat exchangers, which utilize a coolant to facilitate removal of heat from the compressed air. In another embodiment, the intercoolers 30, 32 may be air-to-air heat exchangers, which utilize ambient air to facilitate removal of heat from compressed air. In yet another embodiment, the intercoolers 30, 32 may be a hybrid cooler arrangement that utilizes both air-to-water and air-to-air heat exchangers.

The first-stage turbine 24 is coupled to the exhaust manifold 18 for extracting energy from exhaust gases for rotating a turbocharger shaft 34 coupled to the second-stage compressor 22. The second-stage turbine 26 is coupled to the first-stage turbine 24 for extracting energy from expanded gases fed from the first stage turbine 24, for rotating a turbocharger shaft 36 coupled to the first-stage compressor 20. The expanded gases from the second-stage turbine 26 may be ejected to the atmosphere.

In the illustrated embodiment, an exhaust channel 38 is disposed bypassing the first-stage turbine 24. A bypass control valve 40 is provided to the exhaust channel 38 to control flow through the exhaust channel 38. In some embodiments, all of the exhaust gas from the exhaust manifold 18 is expanded through the first-stage turbine 24. In certain other embodiments, a first portion of the exhaust gas from the exhaust manifold 18 is expanded through the first-stage turbine 24 and a remaining portion (also referred to as "a second portion") of the exhaust gas from the exhaust manifold 18 is fed through the exhaust channel 38 bypassing the first-stage turbine 24. The second portion of the exhaust gas fed through the channel 38 is expanded via the second-stage turbine 26.

The engine 14 includes a plurality of combustion cylinders 42, 44. A first set of cylinders 42 may be referred to as "donor cylinders" and the other set of cylinders 44 may be referred to as "non-donor cylinders". In the illustrated embodiment, the engine 14 includes six donor cylinders 42 and six non-donor cylinders 44. A piston (not shown) is slidably disposed in each cylinder 42, 44 and reciprocates between a top dead center and a bottom dead center position. It should be noted herein that the number of cylinders may vary depending upon the application. The combustion cylinders 42, 44 are coupled to the intake manifold 16 and receive compressed air via the intake manifold 16.

In the illustrated embodiment, the non-donor cylinders 44 are coupled to the exhaust manifold 18. The exhaust gas from the non-donor cylinders 44 are fed via the exhaust manifold 18 to the first-stage turbine 24 and/or the exhaust channel 38. The donor cylinders 42 are coupled to an exhaust gas recirculation manifold 46.

A first recirculation control valve 50 is provided to control flow through the recirculation channel 48. The exhaust gas recirculation manifold 46 is coupled to the intake manifold 16 via a recirculation channel 48. The exhaust gas from the donor cylinders 42 (also referred to as "a third portion of exhaust gas") is fed via the exhaust gas recirculation manifold 46 to the intake manifold 16. In the illustrated embodiment, the recirculation channel 48 is coupled to the exhaust manifold 18 via an exit channel 52. A second recirculation control valve 54 is provided to control flow from the recirculation channel 48 to the exhaust manifold 18. In some embodiments, the entire exhaust gas from the donor cylinders 42 is fed via the exhaust gas recirculation manifold 46, the exhaust gas recirculation channel 48 to the intake manifold 16. In certain embodiments, a portion of the exhaust gas from the donor cylinders 42 is fed via the recirculation channel 48, the exit channel 52 to the exhaust manifold 18. A recirculation cooler 56 is provided to the recirculation channel 48. The recirculation cooler 56 cools the exhaust gas fed through the recirculation channel 48, prior to feeding to the plurality of combustion cylinders 42, 44 via the intake manifold 16.

The turbocharged unit 10 also includes a control unit 58. In the illustrated embodiment, the control unit 58 is an electronic control unit for the turbocharger 12 and the engine 14. In another embodiment, the control unit 58 is an electronic logic control unit that is programmable by a user. The control unit 58 receives a pressure signal 60 from a pressure sensor 62 provided to detect pressure of intake air fed to the engine 14. Additionally, the control unit 58 receives a temperature signal 64 from a temperature sensor 66 provided to detect temperature of intake air fed to the engine 14. The control unit 58 may also receive an oxygen signal 68 from an oxygen sensor 70 provided to detect quantity of oxygen in the intake air fed to the intake manifold 16. In some embodiments, the control unit 58 may also receive an oxygen signal 71 from another oxygen sensor 73 provided to detect quantity of oxygen from the exhaust gas fed from the exhaust manifold 18. Further, the control unit 58 may also receive a mass flow signal 72 from a fuel sensor 74 provided to detect mass flow of a fuel fed to the engine 14. The control unit 58 may also receive a speed signal 11 from a speed sensor 13, a notch signal 15 from a notch sensor 17, a load signal 19 from a load sensor 21, a fuel injection timing signal 23 from an injection timing sensor 25, and an exhaust gas recirculation mass flow signal 27 from a mass flow sensor 29. In the illustrated embodiment, a fuel injector pump 76 drives a plurality of fuel injectors 78 for injecting a fuel 80 into a plurality of cylinders 42, 44 of the engine 14.

In accordance with embodiments of the present invention, the control unit 58 receives the signals 11, 15, 19, 23, 27, 60, 64, 68, 71, 72 and controls the bypass control valve 40, and the first and second recirculation control valves 50, 54 based on the signals 11, 15, 19, 23, 27, 60, 64, 68, 71, 72, so as to control quantity of exhaust gas bypassing the first-stage turbine 24 and recirculated through the recirculation channel 48. In certain other embodiments, the control unit 58 may additionally control the engine speed and/or fuel mass flow by producing a timing signal 82 to control operation of the fuel injectors 78.

As discussed herein, in certain applications, the compression-ignition engines are used in relatively extreme environmental conditions, such as high altitudes, particularly in mountainous regions. These environmental conditions can adversely affect engine performance, efficiency, exhaust pollutants, and other engine characteristics. Conventional engines do not adequately account for impact of ambient conditions to control exhaust emissions and specific fuel consumption of the engine to specific limits.

In accordance with the embodiments of the present invention, air-fuel ratio and quantity of exhaust gas recirculation are varied in response to changes in ambient conditions such as intake manifold air temperature and pressure. In other words, set points of the air-fuel ratio and quantity of exhaust gas recirculation are varied in response to changes in intake manifold air temperature and pressure. The use of variable points of the air-fuel ratio and quantity of exhaust gas recirculation in response to ambient conditions, in conjunction with a corresponding fuel injection strategy and control of engine speed, facilitates maintaining SFC and exhaust emission such as NO$_x$ and particulate matter (PM) within specified limits.

Typically, when an engine is at a higher altitude region or a high temperature region, the airflow delivered to such an engine decreases. Under such a condition, it is required to either maintain the airflow at a required rate or operate at lower airflow rate while still maintaining SFC and emissions within specified limits. In certain such exemplary embodiments of the present invention, the control unit 58 facilitates to increase a quantity of intake air flow to the plurality of combustion cylinders 42, 44 by decreasing feed of the exhaust gas from the exhaust manifold 18 via the exhaust channel 38 bypassing the turbine 24, as a function of the intake manifold air temperature and pressure at which the engine 14 is operated, and vice versa so as maintain a desired air-fuel ratio. In other words, the opening of the bypass control valve 40 is reduced to decrease the flow of exhaust gas through the channel 38 so as to increase airflow to the engine cylinders 42, 44. When the opening of the valve 40 is increased, airflow to the cylinders 42, 44 is reduced.

In some embodiments, to maintain airflow at a predefined rate with increasing altitude, the valve 40 is opened at sea-level operating conditions and closed at a high altitude operating conditions. In certain other embodiments, at high altitude operating conditions, the airflow to the cylinders 42, 44 may be reduced by increasing quantity of exhaust gas recirculation flow through the recirculation channel 48 by controlling opening of the first and second recirculation control valves 50, 54. As mentioned above, the quantity of exhaust gas recirculation flow via the channel 48 to the intake manifold 16 may be reduced by diverting a portion of exhaust gas flow from the channel 48 to the exhaust manifold 18 via the exit channel 52. When the EGR rate is increased, airflow to the cylinders 42, 44 is decreased, and vice versa. Further, the control unit 58 may increase engine speed as a function of ambient conditions, to increase airflow to the cylinders 42, 44. Further, the control unit 58 may change the fuel injection timing as a function of the engine ambient conditions. The control of turbine bypass flow and EGR flow is optimized in conjunction with optimized fuel injection strategy and engine speed, as a function of intake manifold air temperature and pressure, to maintaining a specific fuel consumption (SFC) of the engine and a quantity of exhaust emissions in the exhaust gas, within a predefined SFC limit and an emission limit respectively. It should be noted herein that quantity of oxygen in the intake air flow is dependent on the air-fuel ratio and EGR flow rate.

Figure 2:
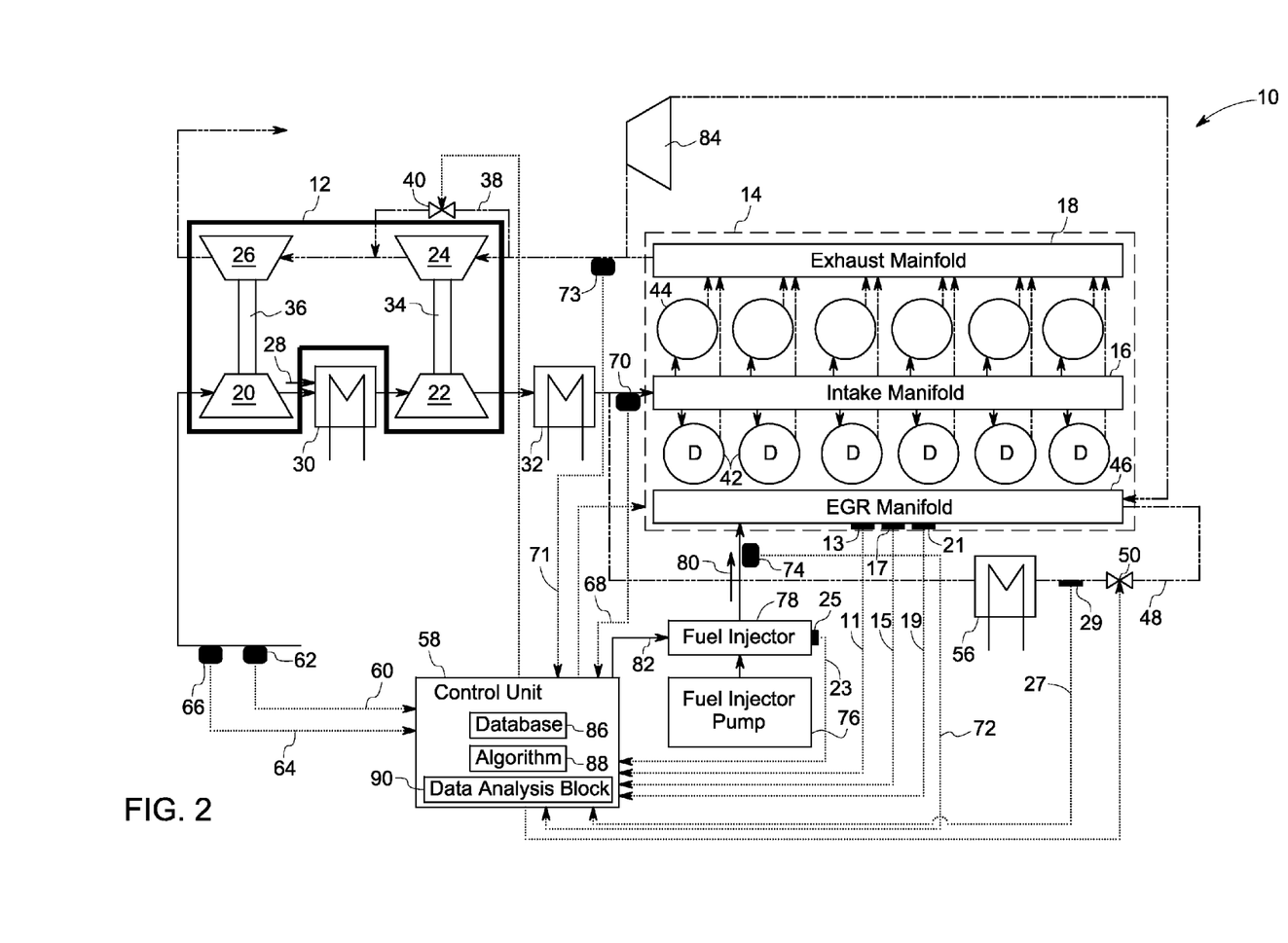
FIG. 2 is a diagrammatical representation of a system in accordance with another exemplary embodiment of the present invention.

Referring to FIG. 2, the turbocharged unit 10 is illustrated in accordance with a particular embodiment of the present invention. Features and aspects of the embodiment illustrated in FIG. 2 are similar to those depicted in the embodiment shown in FIG. 1. The turbocharged unit 10 includes an exhaust compressor 84 coupled to the exhaust manifold 18 and the exhaust gas recirculation manifold 46. The exhaust compressor 84 receives a portion of the exhaust gas from the exhaust manifold 18 and compresses the portion of the exhaust gas, prior to feeding the portion of the exhaust gas via the EGR manifold 46, the recirculation channel 48 to the plurality of the combustion cylinders 42, 44. In other words, the exhaust compressor 84 operates, or functions, as an "EGR pump".

In the illustrated embodiment, all of the exhaust gas from the donor cylinders 42, and the non-donor cylinders 44 is fed to the exhaust gas manifold 18, and subsequently a portion of the exhaust gas is fed from the exhaust gas manifold 18 to the intake manifold 16 via the exhaust gas recirculation manifold 46, and the exhaust gas recirculation channel 48. Compared to the embodiment of FIG. 1, there is no exit channel 52 between the exhaust gas recirculation channel 48 and the exhaust manifold 18.

The control unit 58 may further include a database 86, an algorithm 88, and a data analysis block 90. The database 86 may be configured to store predefined information associated with the turbocharger 12 and the engine 14. For example, the database 86 may store information relating to temperature, and pressure of the intake air, quantity of oxygen in the intake air, fuel injection timing, engine speed, fuel mass flow, or the like. Furthermore, the database 86 may be configured to store actual sensed/detected information from the above-mentioned sensors 13, 17, 21, 25, 29, 62, 66, 70, 73, and 74. The algorithm 88 facilitates the processing of signals from the above-mentioned plurality of sensors 13, 17, 21, 25, 29, 62, 66, 70, 73, and 74.

The data analysis block 90 may include a range of circuitry types, such as a microprocessor, a programmable logic controller, a logic module, and the like. The data analysis block 90 in combination with the algorithm(s) 88 may be used to perform the various computational operations relating to maintaining specific fuel consumption (SFC) of the engine and a quantity of exhaust emissions in the exhaust gas, within a predefined SFC limit and an emission limit respectively. The control unit 58 is operable to control the feed of a portion of the exhaust gas via the exhaust channel 38 bypassing the turbine 24; recirculation of a portion of the exhaust gas to the plurality of combustion cylinders 42, 44 via the recirculation channel 48, as a function of an intake manifold air temperature and pressure at which the engine 14 is operated.

Figure 3:
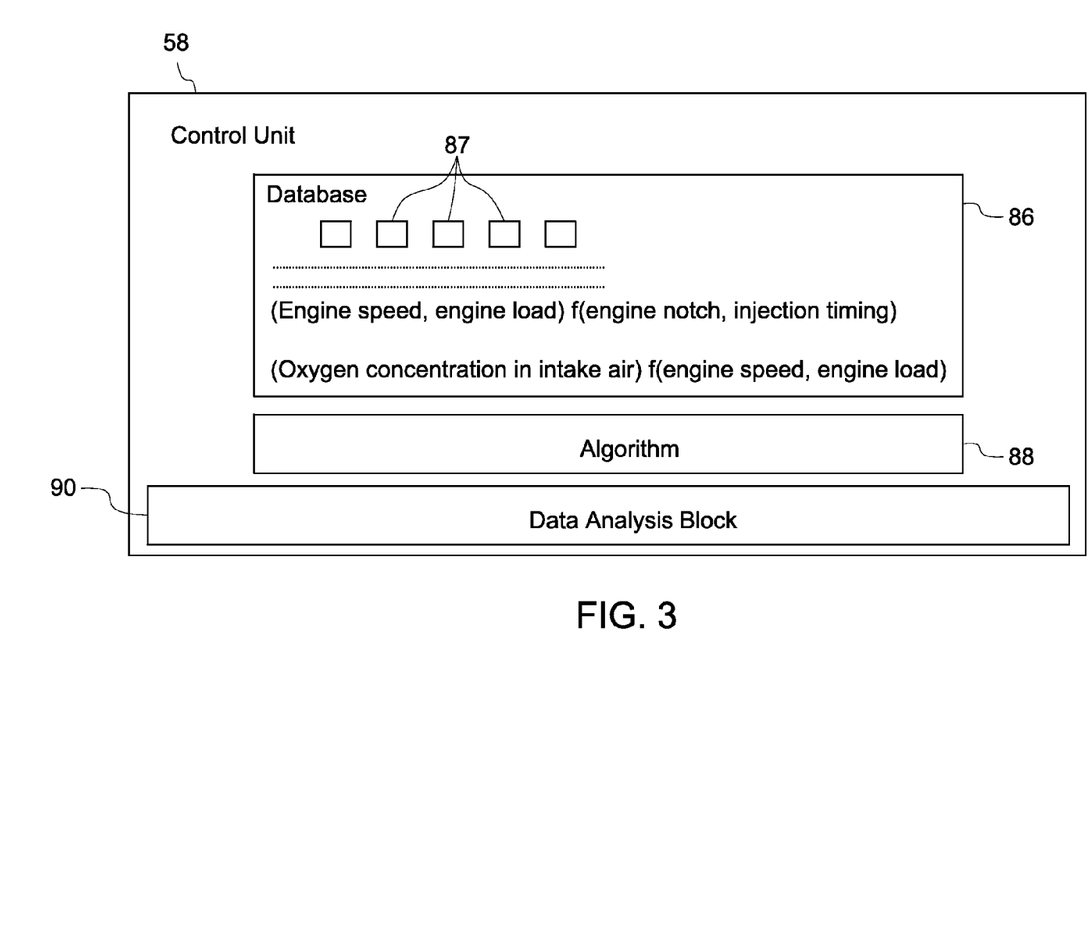
FIG. 3 is a diagrammatical representation of a control unit of the system in accordance with the embodiment of FIG. 2.

Referring to FIG. 3, the control unit 58 is illustrated in accordance with a particular embodiment of the present invention. In the illustrated embodiment, the database 86 includes a plurality of maps 87, wherein each map is representative of a data comprising an engine speed, and an engine load as a function of an engine notch, a fuel injecting timing, and an oxygen concentration in an intake air flow as a function of the engine speed, and the engine load. In certain embodiments, the control unit 58 controlling at least one of the engine speed, the engine load, the oxygen concentration in the intake air flow, the fuel injection timing based on a selected map. The map may be selected based on ambient conditions (intake manifold air temperature and pressure) at which the engine is operated. In some embodiments, the control unit 58 controls the valves 50, 54 (shown in FIG. 1) to control the recirculation of the exhaust gas to the plurality of combustion cylinders via the recirculation channel, thereby controlling the oxygen concentration in the intake air flow. In certain other embodiments, the control unit 58 controls at least one of an oxygen concentration in the intake air flow, a fuel injection timing based on the intake manifold air temperature detected by the temperature sensor.

Figure 4:
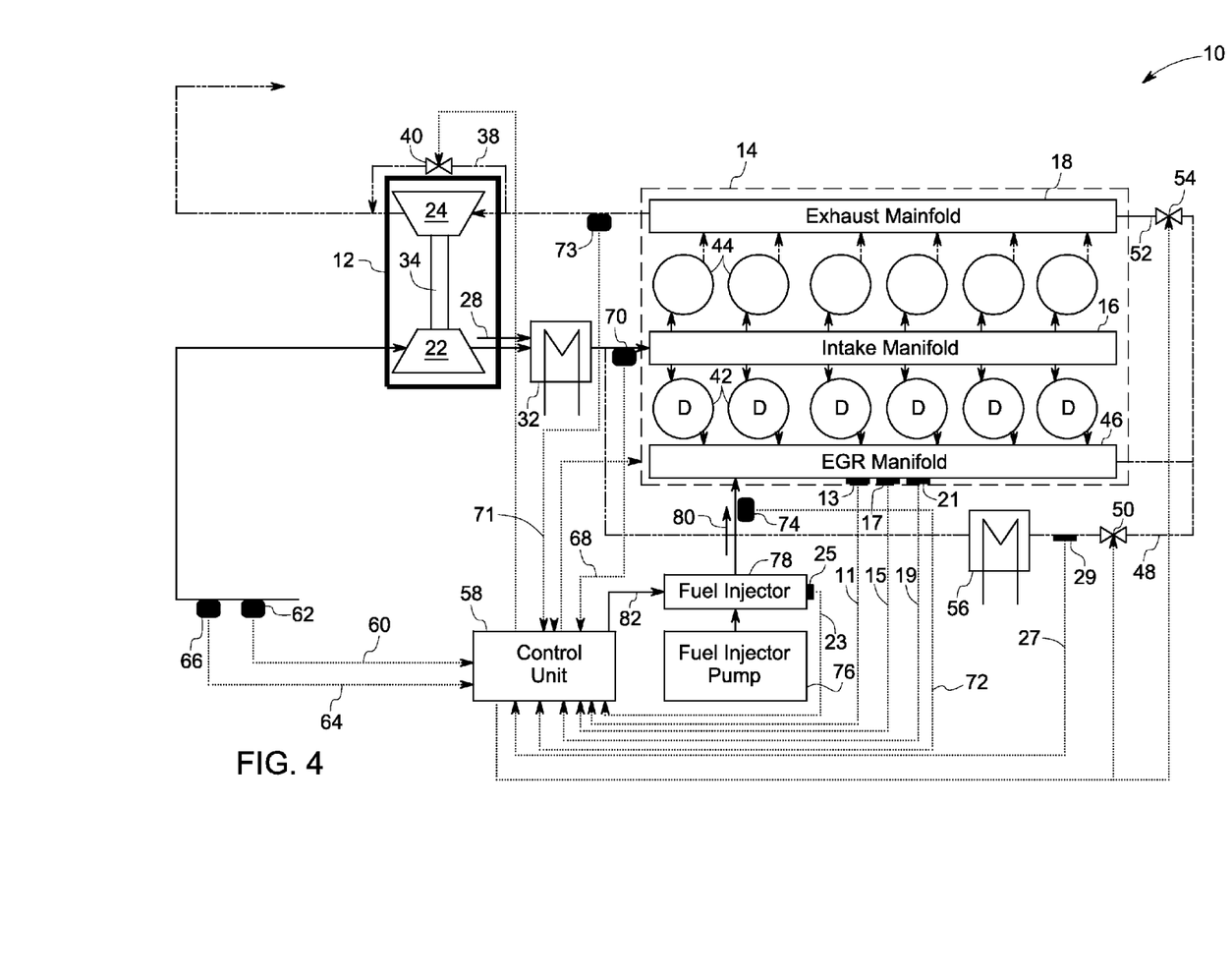
FIG. 4 is a diagrammatical representation of a system in accordance with another exemplary embodiment of the present invention.

Referring to FIG. 4, a turbocharged unit 10 is illustrated in accordance with a particular embodiment of the present invention. Aspects of the illustrated embodiment are similar to the embodiment of FIG. 1, except that the turbocharger 12 has only a single stage compressor 22 and a single stage turbine 24. As discussed herein, intake air 28 may be drawn through a filter (not shown) and then compressed to a higher pressure via the single stage compressor 22. The compressed intake air 28 is cooled via the intercooler 32, and then supplied to the intake manifold 16 for combustion within the engine 14. The single stage turbine 24 is coupled to the exhaust manifold 18 for extracting energy from exhaust gases for rotating a turbocharger shaft 34 coupled to the single stage compressor 22. The expanded gases from the single stage turbine 24 may be ejected to the atmosphere. It should be noted herein that although specific configurations of the turbocharged unit 10 having turbine bypass and EGR features have been shown in FIGS. 1-4, it should not be construed as limiting the scope of the invention. Specific features of the turbocharged unit 10 may vary depending upon the application.

In accordance with the embodiments of the present invention, the SFC and exhaust emissions of the engine 14 are maintained within specific limits over a range of ambient conditions. Different set points of different air-to-fuel-ratio and exhaust gas recirculation levels determined as a function of ambient conditions facilitates to maintain the $NO_x$ and PM levels within specific limits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling an internal combustion engine speed based on a selected map, comprising:
   combusting air within a plurality of cylinders of an internal combustion engine by injecting a fuel into the plurality of cylinders;
   expanding a first portion of an exhaust gas generated from the plurality of combustion cylinders via a turbine;
   selecting the map among a plurality of maps, based on actual values of an intake manifold air temperature and pressure, wherein each map is representative of a data comprising the engine speed, an engine load based on actual values of an engine notch, a fuel injecting timing, an oxygen concentration in an intake air flow based on actual values of the engine speed and the engine load;
   controlling the engine speed based on the selected map; and
   controlling at least one of:
   feeding a second portion of the exhaust gas via an exhaust channel bypassing the turbine; and
   recirculating a third portion of the exhaust gas to the plurality of combustion cylinders via a recirculation channel, based on actual values of the intake manifold air temperature and pressure at which the engine is operated.

2. The method of claim 1, wherein the controlling recirculation comprises controlling feed of the third portion of the exhaust gas, from a first set of cylinders defined as a plurality of donor cylinders among the plurality of combustion cylinders via the recirculation channel to the plurality of the combustion cylinders, using a control system coupled to a first recirculation valve provided to the recirculation channel.

3. The method of claim 2, wherein controlling the recirculation comprises controlling the feed of one portion among the third portion of the exhaust gas, from the recirculation channel to an exhaust manifold of the engine, using the control system coupled to a second recirculation valve coupled to an exit channel extending from the recirculation channel to the exhaust manifold.

4. The method of claim 3, further comprising compressing the other portion among the third portion of the exhaust gas, prior to feeding the other portion among the third portion of the exhaust gas via the recirculation channel to the plurality of the combustion cylinders.

5. The method of claim 1, further comprising cooling the third portion of the exhaust gas via a cooler coupled to the recirculation channel, prior to feeding to the plurality of combustion cylinders.

6. The method of claim 1, wherein the controlling further comprises increasing a quantity of intake air flow to the plurality of combustion cylinders by decreasing recirculation of a third portion of the exhaust gas to the plurality of combustion cylinders via the recirculation channel based on actual values of the intake manifold air temperature and pressure at which the engine is operated, and vice versa.

7. The method of claim 6, further comprising controlling at least one of the engine load, the oxygen concentration in the intake air flow, the fuel injection timing based on the selected map.

8. The method of claim 7, comprising controlling the oxygen concentration in the intake air flow by controlling the recirculation of the third portion of the exhaust gas to the plurality of combustion cylinders via the recirculation channel.

9. The method of claim 6, wherein the controlling further comprises increasing a quantity of intake air flow to the plurality of combustion cylinders by decreasing the feed of a second portion of the exhaust gas via the exhaust channel bypassing the turbine based on actual values of the intake manifold air temperature and pressure at which the engine is operated, and vice versa so as to maintain a desired air-fuel ratio within the plurality of combustion cylinders.

10. The method of claim 1, wherein the controlling further comprises controlling at least one of the oxygen concentration in the intake air flow, the fuel injection timing based on the intake manifold air temperature.

11. The method of claim 1, wherein the controlling further comprises increasing a quantity of intake air flow to the plurality of combustion cylinders by increasing the engine speed based on actual values of the intake manifold air temperature and pressure at which the engine is operated, and vice versa.

12. The method of claim 1, further comprising determining the intake manifold air temperature, pressure, the engine speed, the engine load, the engine notch, the fuel injection timing, a fuel mass flow, an exhaust gas recirculation mass flow, a quantity of oxygen in intake air, and a quantity of oxygen in the exhaust gas, using a plurality of sensors.

13. A system for controlling an internal combustion engine speed based on a selected map, comprising:
   an engine comprising a plurality of combustion cylinders;
   a turbine coupled to the engine, and configured to expand a first portion of an exhaust gas generated from the plurality of combustion cylinders;
   an exhaust channel for feeding a second portion of the exhaust gas bypassing the turbine;
   a recirculation channel for recirculating a third portion of the exhaust gas to the plurality of combustion cylinders; and
   a control system coupled to a bypass control valve and a first recirculation valve provided to the exhaust channel and the recirculation channel respectively and configured to:
   select the map among a plurality of maps, based on actual values of an intake manifold air temperature and pressure, wherein each map is representative of a data comprising the engine speed, an engine load based on actual values of an engine notch, a fuel injecting timing, an oxygen concentration in an intake air flow based on actual values of the engine speed and the engine load;

control the engine speed based on the selected map; and control at least one of:
  feed of the second portion of the exhaust gas via the exhaust channel; and
  recirculation of the third portion of the exhaust gas to the plurality of combustion cylinders via a recirculation channel, based on actual values of the intake manifold air temperature and pressure at which the engine is operated.

14. The system of claim 13, further comprising at least one inlet compressor coupled to the engine and configured to compress intake air and feed compressed air to the plurality of combustion cylinders via an intake manifold.

15. The system of claim 14, further comprising an intercooler configured for receiving compressed intake air, cooling the compressed intake air, and feeding the cooled compressed air to the plurality of combustion cylinders via the intake manifold.

16. The system of claim 14, further comprising an exhaust gas recirculation manifold coupled to a first set of cylinders defined as a plurality of donor cylinders among the plurality of combustion cylinders, wherein the exhaust gas recirculation manifold is further coupled to the intake manifold via the recirculation channel.

17. The system of claim 16, wherein the control system is communicatively coupled to the first recirculation control valve and configured to control the first recirculation control valve to control recirculation of the third portion of the exhaust gas, from the first set of cylinders via the exhaust gas recirculation manifold, the recirculation channel, the intake manifold to the plurality of the combustion cylinders.

18. The system of claim 17, further comprising an exhaust gas manifold coupled to a second set of cylinders defined as a plurality of non-donor cylinders among the plurality of combustion cylinders, wherein the exhaust gas manifold is further coupled to the turbine, the exhaust channel, the exhaust gas recirculation manifold, and the recirculation channel.

19. The system of claim 18, further comprising a second recirculation control valve coupled to an exit channel extending from the exhaust manifold to the recirculation channel.

20. The system of claim 19, wherein the control system is communicatively coupled to the second recirculation control valve and configured to control the second recirculation control valve to control feed of one portion among the third portion of the exhaust gas, from the recirculation channel to the exhaust manifold via the exit channel.

21. The system of claim 18, further comprising an exhaust compressor coupled to the exhaust manifold and the exhaust gas recirculation manifold, wherein the exhaust compressor compresses the other portion among the third portion of the exhaust gas, prior to feeding the other portion among the third portion of the exhaust gas via the exhaust gas recirculation manifold, and the recirculation channel to the plurality of the combustion cylinders.

22. The system of claim 16, wherein the control system is communicatively coupled to the bypass control valve and configured to control the bypass control valve to control feed of the second portion of the exhaust gas via the exhaust channel.

23. The system of claim 16, further comprising a recirculation cooler coupled to the recirculation channel; wherein the recirculation cooler cools the third portion of the exhaust gas, prior to feeding to the plurality of combustion cylinders.

24. The system of claim 16, further comprising a plurality of sensors for determining an intake manifold air temperature, pressure, the engine speed, the engine load, the engine notch, the fuel injection timing, fuel mass flow, an exhaust gas recirculation mass flow, and, a quantity of oxygen in intake air and the exhaust gas, wherein the plurality of sensors are communicatively coupled to the control unit.

25. The system of claim 16, wherein the control unit is communicatively coupled to the engine, wherein the control unit controls at least one of:
  the engine load based on actual values of the engine notch and a fuel injecting timing;
  the oxygen concentration in the intake air flow based on actual values of the engine speed and the engine load;
  the oxygen concentration in the intake air flow, the fuel injection timing based on the intake manifold air temperature.

26. The system of claim 16, wherein the turbine comprises a first stage turbine coupled to an exhaust manifold of the engine, and a second stage turbine coupled to the first stage turbine and disposed downstream of the first stage turbine, wherein the exhaust channel is disposed bypassing the first stage turbine.

27. A non-transitory computer readable medium encoded with a program, to enable a processor-based control unit to execute instructions of:
  determining engine operation by;
  selecting a map among a plurality of maps, based on actual values of an intake manifold air temperature and pressure, wherein each map is representative of a data comprising an engine speed, an engine load based on actual values of an engine notch, a fuel injecting timing, an oxygen concentration in an intake air flow based on actual values of the engine speed and the engine load;
  controlling the engine speed based on the selected map; and
  controlling at least one of:
  feeding a first portion of an exhaust gas via an exhaust channel bypassing a turbine; and
  recirculating a second portion of the exhaust gas to the plurality of combustion cylinders via a recirculation channel, based on actual values of the intake manifold air temperature and pressure at which an engine is operated.

* * * * *